BEST AVAILABLE COPY

BEST AVAILABLE COPY

W. EMMONS.

Horse Rake.

No. 3,937.

Reissued April 26, 1870.

WITNESSES

Cornelius Cox

Leopold Guest

INVENTOR

William Emmons per Alexander & Wasson

Attys

N. PETERS, Photo-Lithographer, Washington, D. C.

United States Patent Office.

WILLIAM EMMONS, OF SANDWICH, ILLINOIS.

*Letters Patent No.* 88,858, *dated April* 13, 1869; *reissue No.* 3,937, *dated April* 26, 1870.

IMPROVEMENT IN HORSE HAY-RAKES.

The Schedule referred to in these Letters Patent and making part of the same

*To all whom it may concern:*

Be it known that I, WILLIAM EMMONS, of Sandwich, in the county of De Kalb and in the State of Illinois, have invented certain new and useful Improvement in Horse Hay-Rakes; and do hereby declare that the following is a full, clear, and exact description thereof, reference being had to the accompanying drawings and to the letters of reference marked thereon.

The nature of my invention consists in the construction and general arrangement of a "horse hay-rake," which will be hereinafter fully set forth.

In order to enable others skilled in the art to which my invention appertains to make and use the same, I will now proceed to describe its construction and operation, referring to the annexed drawings which form a part of this specification, and in which—

Figure 1:
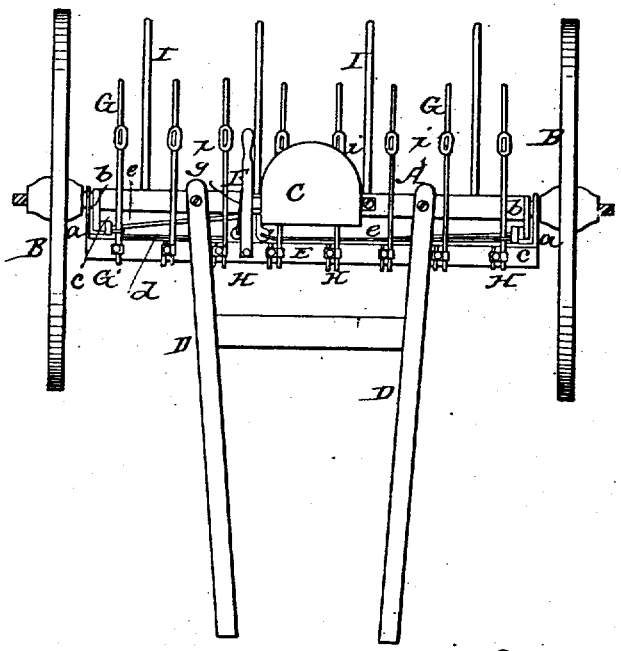

Figure 1 is a plan view, and

Figure 2:
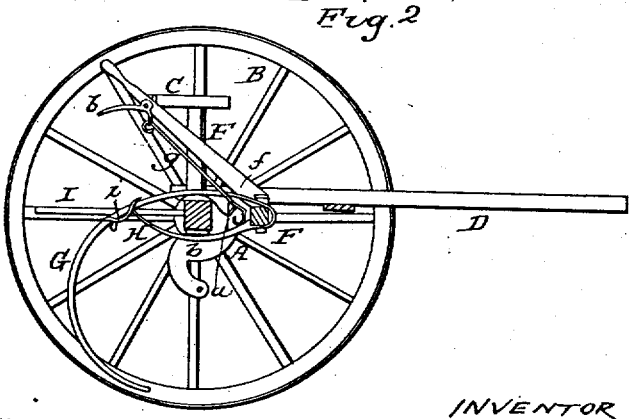

Figure 2, a side elevation in section.

A represents the axle of the machine, on the ends of which the wheels B B are placed.

Near the center of the axle A are two standards or supports, on which the driver's seat C is placed.

D D represent the shafts, the rear ends of which are secured on the upper side of the axle A.

The head E of the rake is situated in front of the axle, under the shafts, and turns on the axle, being attached to the same by means of metal plates *a a*.

The plates *a a* are secured to the ends of the head E, at right angles with the same, and the ends of the axle A pass through holes in said plates or bars before they pass through the hubs of the wheels.

Near the ends of the axle A, inside of the bars *a a*, and on the axle, are placed curved plates or bars *b b*, which are notched on their inner side, and serve to hold the rake in any position desired, by means of dogs or pawls *c c*, which are placed on the rake-head E and pressed into the notches on the bars *b b* by means of springs *d d*.

The dogs or pawls *c c* are withdrawn from the notches in the bars *b b*, by means of rods *e e* connecting them with a three-armed lever, *f*, pivoted to the handle F, extending from the rake-head E at the side of the driver's seat C.

The three-armed lever *f* is, by a rod, *g*, connected with a small lever or thumb-piece, *h*, pivoted on the under side, near the upper end of the handle F, so that, by merely pressing on said thumb-piece *h*, the dogs *c c* are withdrawn, and the rake-teeth raised up from the ground.

The rake-teeth G G pass over the axle A, and around the front side of the rake-head E, to which latter they are secured by nuts and washers on both the upper and lower sides of the rake-head.

The rake-teeth G G are supported by springs H H, which pass under the axle A, and their front ends pass around the rake-head E, in reverse manner to that of the teeth G G, being secured to said head by the same nuts and washers that secure the teeth.

The rear ends of the springs H H pass through a metal loop or buckle, *i*, which passes over each of the teeth, forming two bearings to each.

Instead of forming the rake-tooth and its supporting-springs of two pieces, I may make them of one piece, when the tooth will pass around the rake-head, and extend far enough toward the rear to connect with the loop *i*.

In fig. 1, the tooth marked G′ is of this description. It is secured to the rake-head in the same manner as the others.

It will be seen that the main portion of the tooth slides in the loop or buckle *i*.

All wire-teeth rakes are liable to break, but these teeth will not break, for the reason that they slide in the buckles, and give when they strike a stone or stump, and come back again to their places as soon as they have passed the obstructions.

Between the teeth G G rods I I extend from the axle A, which, when the rake is being raised, serve to disengage the hay collected on the rake.

The manner of attaching the rake to the axle makes the rake-head a perfect balance, so that any boy that can drive can work it with perfect ease.

I am aware that a rake-tooth, with an end bent over the back of the main part of the tooth, and secured there by means of an indented ring, which clasps the back of the tooth while the short end is riveted to the ring, is not new.

My invention not only differs from that in this respect, but is superior and more economical in its construction.

The clasp I use is made of a single piece of metal, and so bent that the parts may be easily and readily engaged and disengaged at will.

I use no ring or rivet in connecting the parts.

The short portion of the tooth, or the portion attached, is clasped in the buckle by spring pressure.

Having thus fully described my invention,

What I claim as new, and desire to secure by Letters Patent, is—

1. The buckle *i*, made of one piece of metal bent into a curved form, and having a narrow slot near each end, through which slots pass the main portion of the tooth G, while the bent or attached portion thereof passes through the two slots, and grasps the central piece of the buckle under the main part of the tooth, as shown and described.

2. The arrangement of the rake-head E, dogs or pawls *c c*, and springs *d d*, with the notched plates or bars *b b*, on the axle A, for the purpose of holding the rake in any position desired, substantially as herein set forth.

3. The arrangement of the rake-head E, handle F, thumb-piece *h*, rod *g*, three-armed lever *f*, and connecting-rods *e e*, for the purpose of withdrawing the dogs or pawls *c c* from the notched bars *b b*, substantially as herein set forth.

In testimony that I claim the foregoing, I have hereunto set my hand this 10th day of March, 1870.

WILLIAM EMMONS.

Witnesses:

L. E. HAY,

CHARLES E. BARK.